United States Patent
Dimakov (10) Patent No.: US 12,235,638 B2
(45) Date of Patent: Feb. 25, 2025

(54) ADAPTIVE TUNING METHOD FOR A DIGITAL PID CONTROLLER

(71) Applicant: Valentin Dimakov, Friedrichshafen (DE)

(72) Inventor: Valentin Dimakov, Friedrichshafen (DE)

( * ) Notice: Subject to any disclaimer, the term of this patent is extended or adjusted under 35 U.S.C. 154(b) by 435 days.

(21) Appl. No.: 17/809,162

(22) Filed: Jun. 27, 2022

(65) Prior Publication Data

US 2022/0357708 A1 Nov. 10, 2022

Related U.S. Application Data

(63) Continuation-in-part of application No. PCT/DE2019/000338, filed on Dec. 27, 2019.

(51) Int. Cl.
*G05B 6/02* (2006.01)

(52) U.S. Cl.
CPC ........................ *G05B 6/02* (2013.01)

(58) Field of Classification Search
CPC ........................................................ G05B 6/02
USPC .................................................... 700/37
See application file for complete search history.

(56) References Cited

U.S. PATENT DOCUMENTS

| | | | | |
|---|---|---|---|---|
| 7,024,253 B2 * | 4/2006 | Gaikwad | ............... | G05B 13/042 |
| | | | | 700/28 |
| 2007/0073422 A1 * | 3/2007 | Gaikwad | ................ | G05B 11/42 |
| | | | | 700/28 |

OTHER PUBLICATIONS

Auto Tuning of PID Controller, By: Arora, pp. 1459-1462 (Year: 2015).*
Auto-Tuning of Digital PID Controllers Using Recursive Identification, By: Bobal, pp. 359-364 (Year: 1995 ).*
Vladimir Bobaj, Marek Kubalclk, Marek Ulehla, Auto-Tuning of Digital PID Controllers Using Recursive Identification, 1995, IFAC Adaptive Systems in Control and Signal Processing, Budapest, Hungary.

(Continued)

*Primary Examiner* — Jigneshkumar C Patel
(74) *Attorney, Agent, or Firm* — CIONCA IP Law P.C.

(57) ABSTRACT

The aim of the invention is rapid automatic tuning the parameters of a digital proportional-integral-derivative (PID) controller by analog feedback of an actual value for automation of technological processes with programmable logic controllers (PLCs).

The proposed invention is based on the use of nine tuning equations derived by reverse engineering of a PID controller. Adjusting the PID controller parameters $K_p$, $K_i$ and $K_d$ is performed in a closed control loop with negative feedback separately in time, i.e. independently of each other in iteration steps k for $K_p$, m for $K_i$ and n for $K_d$ (see FIG. 1).

The adaptive tuning method is compact, independent of other methods and algorithms, mathematically balanced (i.e. minimal computational resource requirements), and easy to implement.

Setting up a PID controller by this method does not require a preliminary evaluation of a controlled system and the creation of its mathematical model. This implies its universal applicability.

2 Claims, 6 Drawing Sheets

(56) References Cited

OTHER PUBLICATIONS

Abhijeet Kishorsingh Sukede, Jasinineet Arora, Auto Tuning of PID Controller, Journal, May 28-30, 2015, International Conference on industrial Instrumentation and Control (ICIC) College of Engineering Pane, India.

Feng Lin, Robert D. Brandt, and George Saikalis, Self-Tuning of PID Controllers by Adaptive Interaction, Jun. 2000, Proceedings of the American Control Conference, Chicago, Illinois.

Chen Yang, Zhang Pan, Li Hongbin, Li Penglin, Yu Zhiqiang, Design of PID Controller of Feed Servo-System Based on Intelligent Fuzzy Control, 2016, Trans Tech Publications, Switzerland.

Xian Wang, Zhe Wang, Taiyong Wang, and Jingchuan Dong, Simulation Research of CNC Machine Servo System Based on Adaptive Fuzzy Control, 2013, Trans Tech Publications, Switzerland.

Tanya Boone, Gerardo Romero, David Lara, Irma Perez, Aldo Mendez, Alberto Reyna, and Jaime Ramos, PID Controller Tuning Based on the Guardian Map Technique, Journal, 2015, vol. 9, International Journal of Systems Applications, Engineering & Development.

Dipraj, DR. A.K. Pandey, Speed Control of D. C. Servo Motor By Fuzzy Controller, Journal, Sep. 2012, vol. 1—Issue 8, International Journal of Scientific & Technology Research.

Three Types of PID Equations, Internet, 2006, BESTune, Copyright (C), BESTune.Com (R).

Prof. DR.-Ing. Holgerlutz, Prof. DR.-Ing. Wolfgang Wendt, Pocketbook on Control Engineering with MATLAB and Simulink, Book, 10th Supplemented Edition.

International Standard, Programmable controllers—Part 3: Programming languages, 2003, Second Edition, International Electrotechnical Commission, Switzerland.

WIPO, International Search Report for International application No. PCT/DE2019/000338, Dec. 15, 2020.

* cited by examiner

ADAPTIVE TUNING METHOD FOR A DIGITAL PID CONTROLLER

BACKGROUND ART

Technical Field of Invention

The invention relates to rapid automatic tuning the parameters of a digital proportional-integral-derivative (PID) controller for automation of technological processes with programmable logic controllers.

Description of the Prior Art

In many cases, the programmable logic controllers (PLCs) are used for automation of technological processes. A PLC usually consists of a CPU and some input and output signal modules. This composition of electronic modules processes signals from digital and analog sensors and controls the various drives of compressors, pumps or valves.

It is frequently necessary to maintain a temperature, pressure, liquid level or gas volume constant by automatic regulation in a segment of an industrial plant. This can be achieved by means of a PID controller, which has proven its reliability and universality through long-term application.

Manual parameterization of a PID controller is not complicated if, for example, a temperature or pressure sensor is located near an actuator (valve or pump), or if the actuator influence on a sensor is not so significant.

However, the manual parameterization of a PID controller becomes much more complicated when a sensor is far away from an actuator, and it is affected with a significant delay. Or, for example, the refrigerant overheating temperature in a chiller is controlled simultaneously by two values from a temperature and pressure transducer. In these or other cases, the manual parameterization of a PID controller requires considerable experience and extensive knowledge of the process equipment. Therefore, it can be helpful to have a device that could do this automatically.

Solving the automatic tuning problem of a PID controller may be compared to the search for an optimal solution. An important factor is determining the initial PID controller parameters $K_p$, $K_i$, and $K_d$ (i.e., proportional $K_p$, integral action $K_i$, and derivative action $K_d$ coefficients) that serve as a starting point for the adaptive tuning method.

Scientific publications and inventions on this subject prefer the automatic tuning methods of a PID controller based on the fuzzy logic mechanism, which allows to achieve a result with high solution quality. However, the overall value of this solution is also high, considering the following features:

- The relatively high computational load of the fuzzy logic mathematical means. The PLCs usually perform various tasks for automation of technological processes and can simultaneously use several PID controllers for this purpose. If the fuzzy logic mechanism is permanently used with PID controllers for modifying the control variables, the cumulative computational load may be very high even for modern PLCs.
- Linking to the specific problems. A rule set of the fuzzy inference method as well as the function parameters for fuzzification and defuzzification are usually chosen to solve a clearly defined problem. This leads to loss of universality of such a solution method.

There are also alternative solutions that use various methods depending on the complexity of controlled systems. At that, the adaptive tuning process usually consists of two stages [1, 2]. In the first stage, the Ziegler and Nichols method is used to set a closed control loop on the stability boundary.

In [1] an assumption is often made about a type of a controlled system of second or third order. Thus, in the second stage the necessary methods for tuning the PID controller parameters are selected: the pole placement, Banyász-Keviczky's or Dahlin's method. Conclusions [1] indicate that this automatic tuning method was tested only on second- and third-order controlled systems.

In [2] only one problem is solved, namely, the automatic tuning of PID controller parameters for a heat exchanger. For this purpose, the Augmented Ziegler and Nichols method is used in the second stage, but a choice of tuning coefficients is not disclosed.

DISCLOSURE OF INVENTION

The aim of the invention is rapid automatic tuning the PID controller parameters by analog feedback of an actual value for automation of technological processes with programmable logic controllers.

The proposed invention is based on the use of nine tuning equations derived by reverse engineering of a PID controller. The adaptive tuning of the PID controller parameters $K_p$, $K_i$, and $K_d$ is performed separately in time, i.e. at any time point t only one PID parameter is modified. This feature is characterized by equations derived for the adaptive tuning method. Therefore, no simultaneous modification of all three PID controller parameters is allowed. In some tuning equations, the additional limiting coefficients are used to ensure a smooth attenuation of the adaptive tuning method and to prevent an abrupt modification of PID controller parameters in the final phase.

Features of the invention:
- The adaptive tuning method is compact, independent of other methods and algorithms, mathematically balanced (i.e., minimal computational resource requirements), and easy to implement.
- Setting up a PID controller by this method does not require a preliminary evaluation of a controlled system and the creation of its mathematical model. This implies its universal applicability, i.e. no linking to a specific controlled system.
- Possible application restriction:
- The method convergence depends on the given initial values of the PID controller parameters $K_p$, $K_i$, and $K_d$ analogues to the search algorithms for a minimum in optimization problems.

BRIEF DESCRIPTION OF DRAWINGS

All features that accentuate novelty of the invention are described in detail in the claims attached. However, the essence of the invention is shown in the following detailed description with references to drawings of the best mode for carrying out the invention:

BEST MODE FOR CARRYING OUT THE INVENTION

The following detailed description with accompanying drawings refers to the best mode for carrying out the invention, which should not be considered as a stripped-down form of the invention object. All amendments and supplements contained in the claims are disclosed in the relevant claims.

The best mode for carrying out the invention is described below.

The proposed invention relates to the adaptive tuning of a PID controller described by a standard equation as follows [3]:

$$y_t = K_p \cdot e_t + K_i \cdot \int e_t dt + K_d \cdot \frac{de_t}{dt}, \qquad (1)$$

in which:
$y_t$ is a control variable at time t;
$e_t$ is a control error between a setpoint w and an actual value $x_t$ at time t, which is calculated as $e_t = w - x_t$;
$K_p$ is a proportional coefficient;
$K_i$ is an integral action coefficient;
$K_d$ is a derivative action coefficient.

The PID controller (1) is a basis for reverse engineering to derive the tuning equations for parameters $K_p$, $K_i$, and $K_d$. This derivation method is characterized by the following sequence of steps:

Step 01: Eliminate an integrator represented explicitly in a PID controller. This is achieved by differentiating both sides of equation (1) according to the time t[3]:

$$dy_t = K_p \cdot de_t + K_i \cdot e_t \cdot dt + K_d \cdot \frac{d^2 e_t}{dt} \qquad (2)$$

Figure 1:
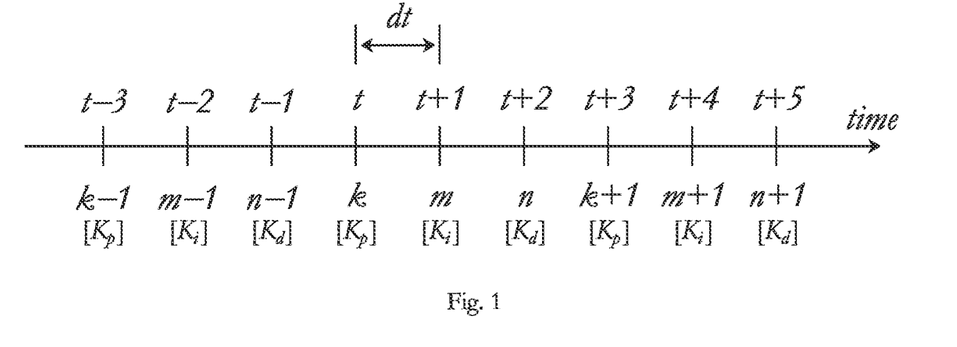
FIG. 1. Time scale for tuning of a PID controller

Step 02: Fixing two of the three PID controller parameters at any time point t. To maximally simplify the derivation method of tuning equations, two of the three PID controller parameters $K_p$, $K_i$, and $K_d$ are used as fixed values in succession. That is, $K_i$ and $K_d$ are used as fixed values in tuning equations for $K_p$ at time t. $K_p$ and $K_d$ are used as fixed values in tuning equations for $K_i$ at time t+1. And $K_p$ and $K_i$ are used as fixed values in tuning equations for $K_d$ at time t+2. Thus, the adaptive tuning of all three PID controller parameters $K_p$, $K_i$, and $K_d$ is performed separately in time, i.e. only one PID parameter is modified at any time point t. To separate the parameter modifications in the tuning method over time and determine the iteration steps, three additional indices k for $K_p$, m for $K_i$, and n for $K_d$ are used (see FIG. 1). With these indices the PID controller (2) takes its final form:

$$dy_t = K_{p_k} \cdot de_t + K_{i_m} \cdot e_t \cdot dt + K_{d_n} \cdot \frac{d^2 e_t}{dt} \qquad (3)$$

Step 03: Derive an equation to calculate an adjustment step value $dK_{p\,k}$ for the proportional coefficient $K_p$. For this purpose, the parameter $K_{p\,k}$ is expressed from (3), and the derived equation is differentiated according to the time t:

$$dK_{p_k} = \frac{\left(d^2 y_t - K_{i_{m-1}} \cdot de_t \cdot dt - K_{d_{n-1}} \cdot \frac{d^3 e_t}{dt}\right) \cdot de_t}{(de_t)_2} - \frac{\left(dy_t - K_{i_{m-1}} \cdot e_t \cdot dt - K_{d_{n-1}} \cdot \frac{d^2 e_t}{dt}\right) \cdot d^2 e_t}{(de_t)_2}, \qquad (4)$$

in which:
$dy_t$ is a control variable change at time t, which is determined as $dy_t = y_t - y_{t-1}$;
$d^2 y_t$ is a $2^{nd}$ order differential of the control variable $y_t$ at time t, which is calculated as $d^2 y_t = dy_t - dy_{t-1}$;
$de_t$ is a $1^{st}$ order differential of the control error $e_t$ at time t, which is calculated as $de_t = e_t - e_{t-1}$;
$d^2 e_t$ is a $2^{nd}$ order differential of the control error $e_t$ at time t, which is calculated as $d^2 e_t = e_t - 2 \cdot e_{t-1} + e_{t-2}$;
$d^3 e_t$ is a $3^{rd}$ order differential of the control error $e_t$ at time t, which is calculated as $d^3 e_t = e_t - 3 \cdot e_{t-1} \cdot e_{t-2} - e_{t-3}$;
$K_{i\,m-1}$ is the actual integral action coefficient $K_i$ at time t, which was modified in iteration step m−1;
$K_{d\,n-1}$ is the actual derivative action coefficient $K_d$ at time t, which was modified in iteration step n−1.

Step 04: Determine a rule to adjust the proportional coefficient $K_p$ in iteration step k as follows:

$$K_{p_k} = K_{p_{k-1}} - \alpha_{p_k} \cdot dK_{p_k},$$

$$\alpha_{p_k} \cdot dK_{p_k} \in [-0.5, +0.5], \qquad (5)$$

in which:
$K_{p\,k-1}$ is the actual proportional coefficient $K_p$ at time t, which was modified in iteration step k−1;
$\alpha_{p\,k}$ is an adjustment speed for the proportional coefficient $K_p$ in iteration step k.

Equation (5) limits the maximum modification of the parameter $K_p$ up to ±0.5 to prevent uncontrollability of the tuning method.

Step 05: Derive an equation to calculate an adjustment speed $\alpha_{p\,k}$ for the proportional coefficient $K_p$. For this purpose, equation (5) is substituted into (3), and the control error $e_t$ is expressed from the derived equation. Considering that a limit of $e_t$ as $t \to +\infty$ equals zero, $\alpha_{p\,k}$ is expressed from the derived equation:

$$\alpha_{p_k} = \frac{K_{p_{k-1}} \cdot de_t + K_{d_{n-1}} \cdot \frac{d^2 e_t}{dt} - dy_t}{dK_{p_k} \cdot de_t} \cdot dt, \qquad (6)$$

$$\alpha_{p_k} \in \left[0.001, \frac{e_t^4}{2.718282} \in [0.0001, 1]\right]$$

This equation is characterized by an additional limitation of the parameter $\alpha_{p\,k}$ in the range from 0.0001 to 1 depending on the control error $e_t$. This ensures a smooth attenuation of the adaptive tuning method in the final phase. In addition, this prevents an abrupt modification of the proportional coefficient $K_p$ when the control error $e_t$ approaches zero.

Step 06: Derive an equation to calculate an adjustment step value $dK_{i\,m}$ for the integral action coefficient $K_i$.

For this purpose, the parameter $K_{i\,m}$ is expressed from (3), and the derived equation is differentiated according to the time t:

$$dK_{i_m} = \frac{\left(d^2 y_t - K_{p_k} \cdot d^2 e_t \cdot dt - K_{d_{n-1}} \cdot \frac{d^3 e_t}{dt}\right) \cdot e_t}{e_t^2 \cdot dt} - \frac{\left(dy_t - K_{p_k} \cdot de_t - K_{d_{n-1}} \cdot \frac{d^2 e_t}{dt}\right) \cdot de_t}{e_t^2 \cdot dt} \quad (7)$$

Step 07: Determine a rule to adjust the integral action coefficient $K_i$ in iteration step m as follows:

$$K_{i_m} = K_{i_{m-1}} + \alpha_{i_m} \cdot dK_{i_m},$$

$$\alpha_{i_m} \cdot dK_{i_m} \in [-0.5, +0.5], \quad (8)$$

in which:
$\alpha_{i\,m}$ is an adjustment speed for the integral action coefficient $K_i$ in iteration step m.

Equation (8) limits the maximum modification of the parameter $K_i$ up to ±0.5 to prevent uncontrollability of the tuning method.

Step 08: Derive an equation to calculate an adjustment speed $\alpha_{i\,m}$ for the integral action coefficient $K_i$. For this purpose, equation (8) is substituted into (3), and the 1$^{st}$ order differential of the control error $de_t$ is expressed from the derived equation. Considering that a limit of $de_t$ as $t \to +\infty$ equals zero, $\alpha_{i\,m}$ is expressed from the derived equation:

$$\alpha_{i_m} = \frac{dy_t - K_{i_{m-1}} \cdot e_t \cdot dt - K_{d_{n-1}} \cdot \frac{d^2 e_t}{dt}}{dK_{i_m} \cdot e_t} \cdot dt, \quad (9)$$

$$\alpha_{i_m} \in \left[0.001, \frac{4 \cdot |e_t^3|}{2.71828} \in [0.0001, 1]\right]$$

This equation is characterized by an additional limitation of the parameter $\alpha_{i\,m}$ in the range from 0.0001 to 1 depending on the control error $e_t$. This ensures a smooth attenuation of the adaptive tuning method in the final phase. In addition, this prevents an abrupt modification of the integral action coefficient $K_i$ when the control error $e_t$ approaches zero.

Step 09: Derive an equation to calculate an adjustment step value $dK_{d\,n}$ for the derivative action coefficient $K_d$. For this purpose, the parameter $K_{d\,n}$ is expressed from (3), and the derived equation is differentiated according to the time t:

$$dK_{d_n} = \left(\frac{(d^2 y_t - K_{p_k} \cdot d^2 e_t - K_{i_m} \cdot de_t \cdot dt) \cdot d^2 e_t}{(d^2 e_t)^2} - \frac{(dy_t - K_{p_k} \cdot de_t - K_{i_m} \cdot e_t \cdot dt) \cdot d^3 e_t}{(d^2 e_t)^2}\right) \cdot dt \quad (10)$$

Step 10: Determine a rule to adjust the derivative action coefficient $K_d$ in iteration step n as follows:

$$K_{d_n} = K_{d_{n-1}} - \alpha_{d_n} \cdot dK_{d_n},$$

$$\alpha_{d_n} \cdot dK_{d_n} \in [-0.5, +0.5], \quad (11)$$

in which:
$\alpha_{d\,n}$ is an adjustment speed for the derivative action coefficient $K_d$ in iteration step n.

Equation (11) limits the maximum modification of the parameter $K_d$ up to ±0.5 to prevent uncontrollability of the tuning method.

Step 11: Derive an equation to calculate an adjustment speed $\alpha_{d\,n}$ for the derivative action coefficient $K_d$. For this purpose, equation (11) is substituted into (3), and the control error $e_t$ is expressed from the derived equation. Considering that a limit of $e_t$ as $t \to +\infty$ equals zero, $\alpha_{d\,n}$ is expressed from the derived equation:

$$\alpha_{d_n} = \frac{K_{p_k} \cdot de_t + K_{d_{n-1}} \cdot \frac{d^2 e_t}{dt} - dy_t}{dK_{d_n} \cdot d^2 e_t} \cdot dt^2, \quad (12)$$

$$\alpha_{d_n} \in \left[0.001, \frac{|e_t^5|}{13.5914} \in [0.0001, 1]\right]$$

This equation is characterized by an additional limitation of the parameter $\alpha_{d\,n}$ in the range from 0.0001 to 1 depending on the control error $e_t$. This ensures a smooth attenuation of the adaptive tuning method in the final phase. In addition, this prevents an abrupt modification of the derivative action coefficient $K_d$ when the control error $e_t$ approaches zero.

Step 12: Select a digital PID controller. The PID velocity algorithm is the most suitable variant for this adaptive tuning method (see [4], p. 1085):

$$\begin{aligned} y_t &= y_{t-1} + dy_{t+1} \\ &= y_{t-1} + \left(K_p + K_i \cdot dt + \frac{K_d}{dt}\right) \cdot e_t - \\ &\quad \left(K_p + 2 \cdot \frac{K_d}{dt}\right) \cdot e_{t-1} + \frac{K_d}{dt} \cdot e_{t-2}, \end{aligned} \quad (13)$$

$$y_t \in [0, 100\%], \; y_{t \leq 0} = dy_{t \leq 0} = 0,$$

in which:
$dy_{t+1}$ is a control variable change for the time t+1;
dt is a sampling time of a digital PID controller.

In this equation the actual values of the PID controller parameters $K_p$, $K_i$, and $K_d$ are always used at time t.

A choice of the PID velocity algorithm is caused by the following criterion:

Direct integration of control errors $e_t$ into the control variable $y_t$. In practice, this allows the control variable $y_t$ to be forcibly modified as needed without explicitly correcting an integrator for seamless functionality (as distinct from the PID position algorithm).

Figure 2A:
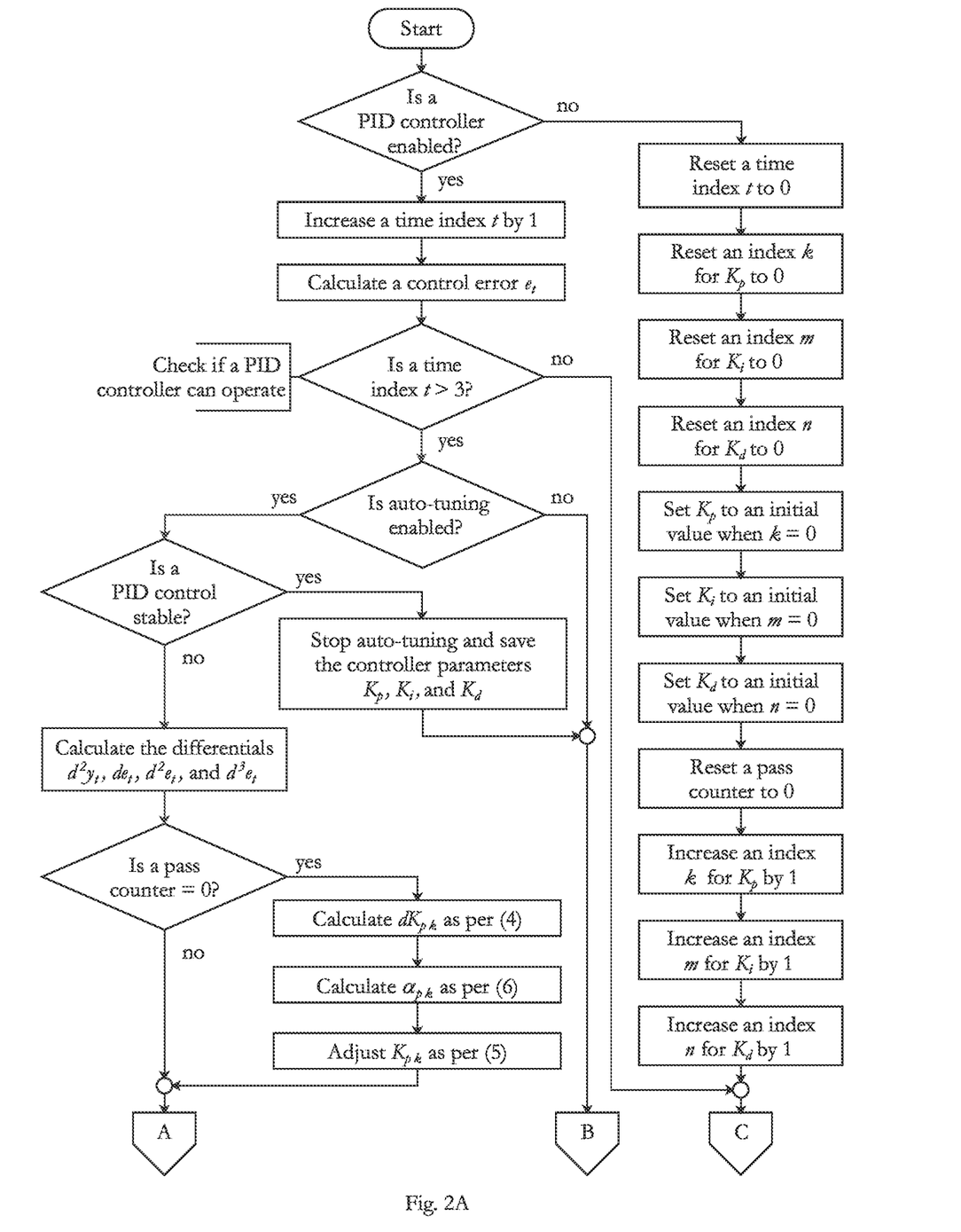
FIG. 2A. Flowchart of the adaptive tuning method for a PID controller (start)
Figure 2B:
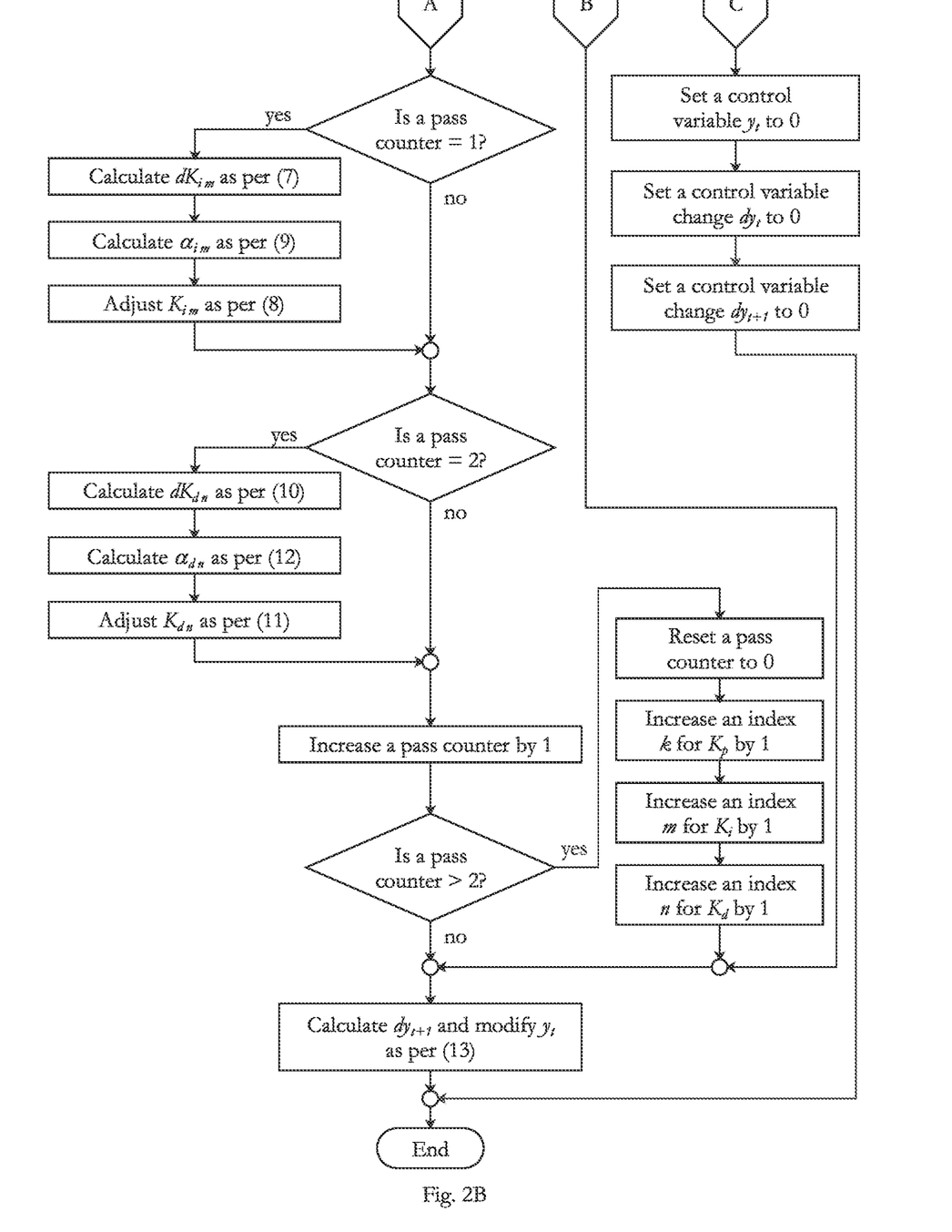
FIG. 2B. Flowchart of the adaptive tuning method for a PID controller (end)

Finally, a flowchart shown in drawings FIG. 2A and FIG. 2B integrates and arranges the equations for automatic tuning of a digital PID controller as a sequence of steps to illustrate the entirety and completeness of the proposed invention description.

Demonstration of the Invention

To illustrate the description, the invention is demonstrated on some mathematical models of controlled systems.

Figure 3:
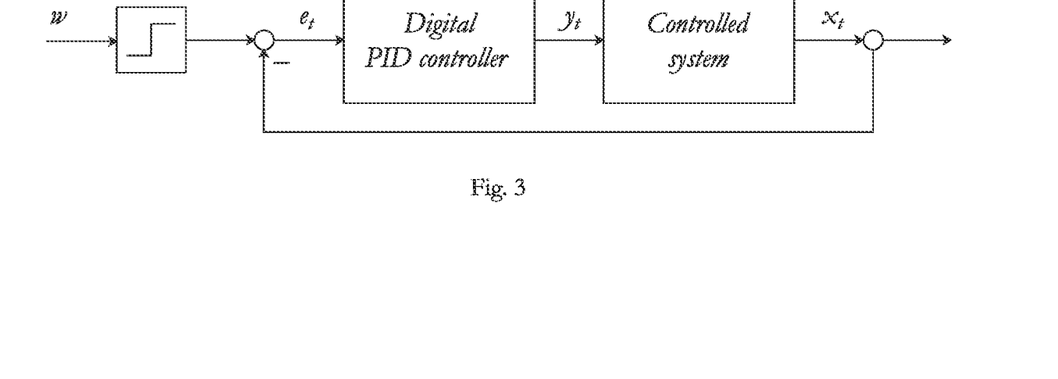
FIG. 3. Closed control loop

FIG. 3 shows a closed control loop with negative feedback that consists of a PID controller and a controlled system.

To demonstrate the invention, the adaptive digital PID controller developed for a PLC in the programming language SCL (Structured Control Language [5], see Appendix A) was used with some transfer functions as controlled systems (see Table I).

TABLE I

Transfer functions G(s) of controlled systems in the Laplace s-domain

| No. | Transfer functions G(s) | Reference |
|---|---|---|
| 1 | $G(s) = \dfrac{5000}{(s+1)(s+5)(s+100)}$ | [6] |
| 2 | $G(s) = \dfrac{160000}{7.22\,s^3 + 8.265\,s^2 + 381600\,s + 160000}$ | [7] |
| 3 | $G(s) = \dfrac{1}{s^2 + s + 1}$ | [8] |
| 4 | $G(s) = \dfrac{0.1\,s + 10}{0.0004\,s^4 + 0.045\,s^3 + 0.555\,s^2 + 1.41\,s + 1}$ | [9] |
| 5 | $G(s) = \dfrac{0.05187936 - 3.594 \times 10^{-6}\,s}{0.0002979\,s^2 + 0.01011916\,s + 0.0092}$ | [10] |

Since the transfer functions G(s) in the Laplace s-domain cannot be used explicitly in a PLC, they are to be converted beforehand into equivalent equations of the time domain. For this purpose, the transfer functions G(s) are first converted by the MATLAB function c2d from the Laplace s-domain into similar discrete transfer functions in the Z-domain with a sampling time dt=0.1 s (see Table II).

TABLE II

Equivalent transfer functions in the z-domain with a sampling time dt = 0.1 s

| No. | Discrete transfer functions in the z-domain G(z) |
|---|---|
| 1 | $G(z) = \dfrac{0.05488 + 0.2462\,z^{-1} + 0.07307\,z^{-2} + 0.0002884\,z^{-3}}{1 - 1.511\,z^{-1} + 0.5489\,z^{-2} - 2.492 \times 10^{-5}\,z^{-3}}$ |
| 2 | $G(z) = \dfrac{0.02055 + 0.0421\,z^{-1} + 0.04063\,z^{-2} + 0.01885\,z^{-3}}{1 + 008548\,z^{-1} - 0.07151\,z^{-2} - 0.8918\,z^{-3}}$ |
| 3 | $G(z) = \dfrac{0.001625 + 0.006338\,z^{-1} + 0.001546\,z^{-2}}{1 - 1.895\,z^{-1} + 0.9048\,z^{-2}}$ |
| 4 | $G(z) = \dfrac{000809 + 006928\,z^{-1} + 005295\,z^{-2} + 00036\,z^{-3} - 9.182 \times 10^{-8}\,z^{-4}}{1 - 2059\,z^{-1} + 1327\,z^{-2} - 02546\,z^{-3} + 1301 \times 10^{-5}\,z^{-4}}$ |
| 5 | $G(z) = \dfrac{0.1464 + 0.3096\,z^{-1} + 0.02883\,z^{-2}}{1 - 0.9475\,z^{-1} + 0.03348\,z^{-2}}$ |

The transfer functions in the z-domain are then converted into recurrent equations of the time domain as polynomials as follows (for details, see [4], pp. 443-444):

$$x_t = b_1 \cdot x_{t-1} + b_2 \cdot x_{t-2} + b_3 \cdot x_{t-3} + b_4 \cdot x_{t-4} + \alpha_0 y_t + \alpha_1 y_{t-1} + \alpha_2 y_{t-2} + \alpha_3 y_{t-3} + \alpha_4 y_{t-4}, \quad (14)$$

in which:
$y_t$ is a control variable of a PID controller at time t;
$x_t$ is a controlled system response on the control variable as a simulated sensor value at time t.

All polynomial parameters (14) for the simulated controlled systems are given in Table III.

TABLE III

Polynomial parameters (14) for transfer functions of the controlled systems

| No. | $b_1$ | $b_2$ | $b_3$ | $b_4$ | $a_0$ | $a_1$ | $a_2$ | $a_3$ | $a_4$ |
|---|---|---|---|---|---|---|---|---|---|
| 1 | 1.511 | −0.5489 | $2.492 \times 10^{-5}$ | 0 | $5.488 \times 10^{-2}$ | 0.2462 | $7.307 \times 10^{-2}$ | $2.884 \times 10^{-4}$ | 0 |
| 2 | $-8.548 \times 10^{-2}$ | $7.151 \times 10^{-2}$ | 0.8918 | 0 | $2.055 \times 10^{-2}$ | $4.21 \times 10^{-2}$ | $4.063 \times 10^{-2}$ | $1.885 \times 10^{-2}$ | 0 |
| 3 | 1.895 | −0.9048 | 0 | 0 | $1.625 \times 10^{-3}$ | $6.338 \times 10^{-3}$ | $1.546 \times 10^{-3}$ | 0 | 0 |
| 4 | 2.059 | −1.327 | 0.2546 | $-1.301 \times 10^{-5}$ | $8.09 \times 10^{-3}$ | $6.928 \times 10^{-2}$ | $5.295 \times 10^{-2}$ | $3.6 \times 10^{-3}$ | $-9.182 \times 10^{-8}$ |
| 5 | 0.9475 | $-3.348 \times 10^{-2}$ | 0 | 0 | 0.1464 | 0.3096 | $2.883 \times 10^{-2}$ | 0 | 0 |

The simulation was performed on a computer-aided PLC simulator as a closed control loop (see FIG. 3). The results shown in Table IV were obtained for all mathematical models of the controlled systems from Table I. Here $T_i$ is a reset time, which is determined as $T_i = K_p/K_i$, and $T_d$ is a derivative time, which is determined as $T_d = K_d/K_p$. All experiments were performed with initial parameters $K_p=1$, $K_i=1$, $K_d=1$, and a sampling time dt=0.1 s. A step function 0→1 was used as an activation trigger.

TABLE IV

Parameters of a digital PID controller found using the adaptive tuning method

Parameters of a PID controller for controlled systems

Figure 4:
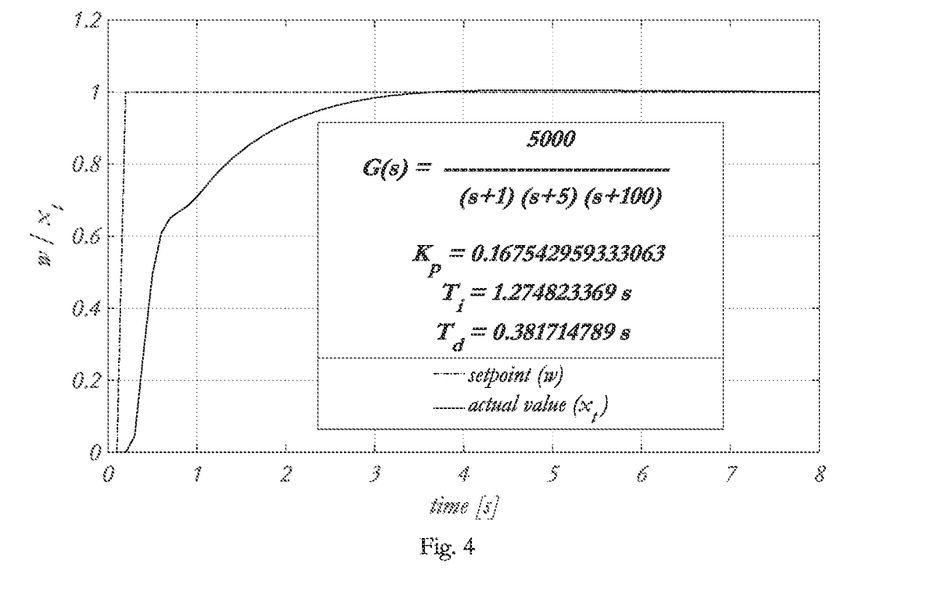
FIG. 4. Reaction of controlled system no. 1 to a step function
Figure 5:
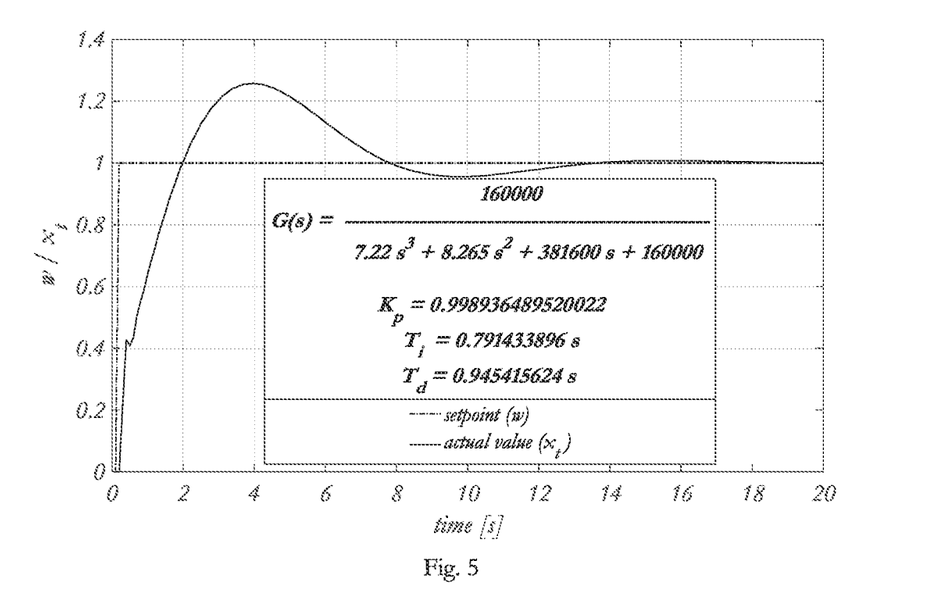
FIG. 5. Reaction of controlled system no. 2 to a step function
Figure 6:
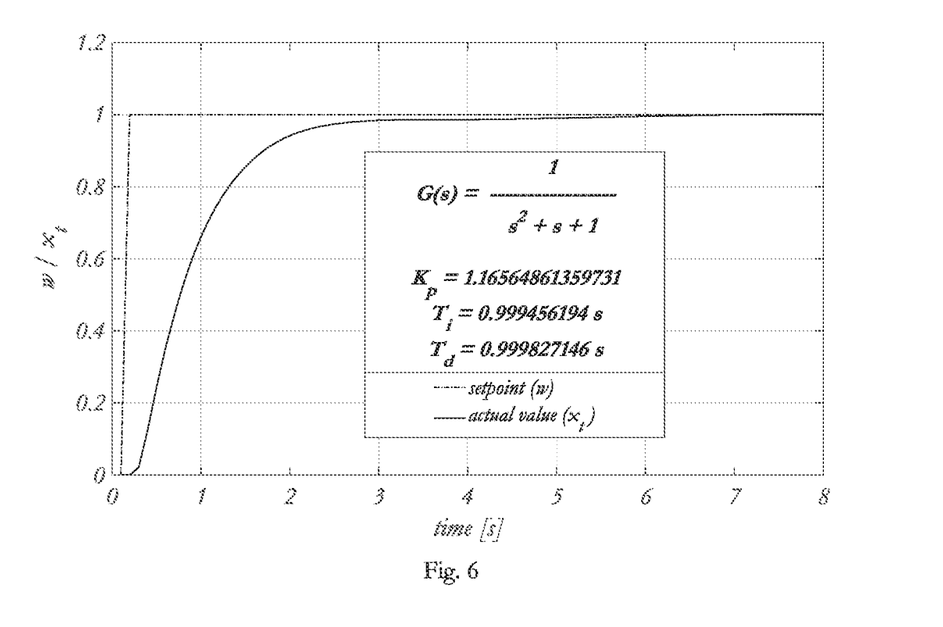
FIG. 6. Reaction of controlled system no. 3 to a step function

| No. | $K_p$ | $T_i$ [s] | $T_d$ [S] | FIG. |
|---|---|---|---|---|
| 1 | 0.167542959333063 | 1.274823369 | 0.381714789 | 4 |
| 2 | 0.998936489520022 | 0.791433896 | 0.945415624 | 5 |
| 3 | 1.16564861359731 | 0.999456194 | 0.999827146 | 6 |

TABLE IV-continued

Parameters of a digital PID controller found
using the adaptive tuning method

Parameters of a PID controller for controlled systems

Figure 7:
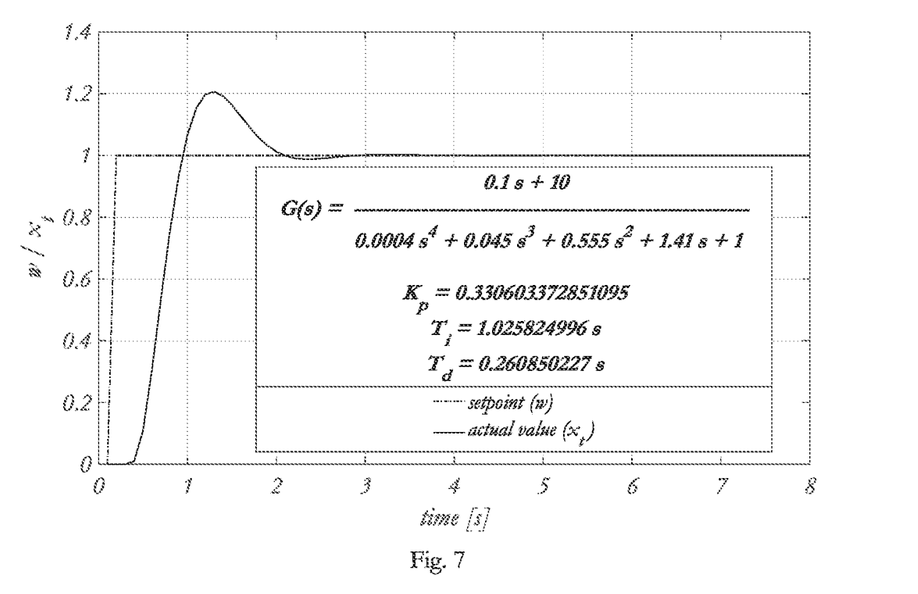
FIG. 7. Reaction of controlled system no. 4 to a step function
Figure 8:
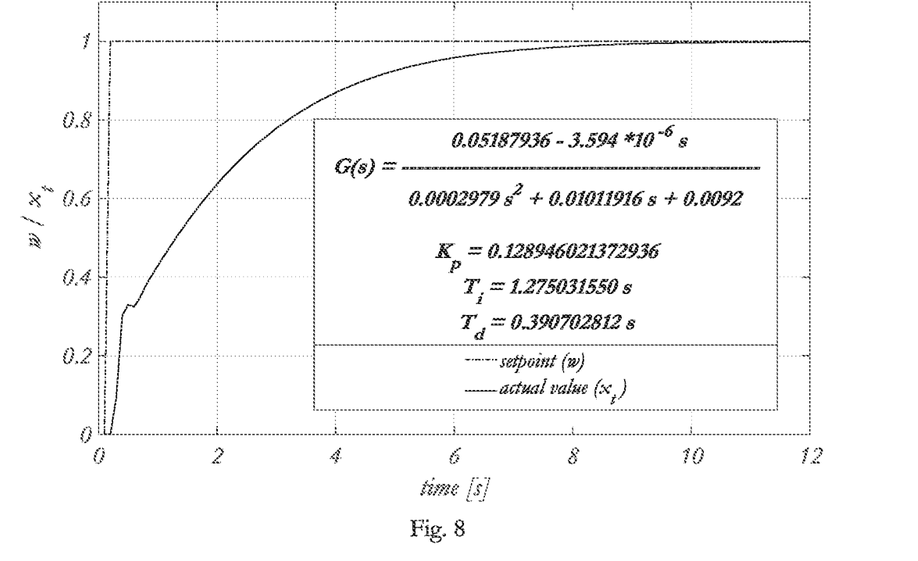
FIG. 8. Reaction of controlled system no. 5 to a step function

| No. | $K_p$ | $T_i$ [s] | $T_d$ [S] | FIG. |
|---|---|---|---|---|
| 4 | 0.330603372851095 | 1.025824996 | 0.260850227 | 7 |
| 5 | 0.128946021372936 | 1.275031550 | 0.390702812 | 8 |

REFERENCES

[1] Vladimir Bobal et. al., "AUTO-TUNING OF DIGITAL PID CONTROLLERS USING RECURSIVE IDENTIFICATION", *Adaptive systems in Control and Signal Processing*, Jun. 16, 1995 (1995-06-16), pp. 359-364, XP055754038, Great Britain, ISBN: 978-0-08-042375-3.
[2] Sukede Abhijeet Kishorsingh et al., "Auto tuning of PID controller", 2015 *International Conference on Industrial Instrumentation and Control (ICIC)*, IEEE, May 28-30, 2015, pp. 1459-1462, XP033170865.
[3] "Three Types of PID Equations", http://bestune.50megs.com/typeABC.htm
[4] Lutz H., Wendt W., "Taschenbuch der Regelungstechnik mit MATLAB and Simulink", 10., ergänzte Auflage, Verlag Europa-Lehrmittel, Haan-Gruiten, 2014.
[5] International standard IEC 61131-3:2013. Programmable controllers—Part 3: Programming languages.
[6] Lin Feng, Brandt Robert D., Saikalis George, "Self-tuning of PID Controllers by Adaptive Interaction", *Proceedings of the* 2000 *American Control Conference*, pp. 3676-3681.
[7] Y. Chen et al., "Design of PID Controller of Feed Servo-System Based on Intelligent Fuzzy Control", *Key Engineering Materials*, Vol. 693, pp. 1728-1733, 2016.
[8] X. Wang et al., "Simulation Research of CNC Machine Servo System Based on Adaptive Fuzzy Control", *Advanced Materials Research*, Vol. 819, pp. 181-185, 2013.
[9] T. Boone et al., "PID Controller Tuning Based on the Guardian Map Technique", *International Journal of Systems Applications, Engineering& Development*, Vol. 9, pp. 192-196, 2015.
[10] Dipraj, Dr. A. K. Pandey, "Speed Control of D.C. Servo Motor By Fuzzy Controller", *International Journal of Scientific& Technology Research*, Vol. 1, Issue 8, pp. 139-142, 2012.

INDUSTRIAL APPLICABILITY

This invention is preferably used in automation systems of industrial facilities with programmable logic controllers, where the individual tuning of PID controller parameters is required to regulate the technological processes in production.

APPENDIX A

A source code of the adaptive digital PID controller

```
001   FUNCTION_BLOCK "A-PID_CONTROL"
002   TITLE           = A-PID controller
003   AUTHOR          : Valentin_Dimakov
004   FAMILY          : PID_CONTROL
005   NAME            : 'A-PID_CONTROL'
006   VERSION         : 13.44
007   // FUNCTION
008   // Digital PID controller with automatic tuning of parameters
009   //
010   // Called blocks: none
011
012   VAR_INPUT
013      MAN_ON            : Bool      := FALSE;     // Switch-over between manual & automatic mode (0=A/1=M)
014      AUTO_ON           : Bool      := FALSE;     // Activate automatic mode for the A-PID controller
015      INV_CONTROL       : Bool      := FALSE;     // Control direction (0 = SP > PV, 1 = PV > SP)
016      CYCLE             : Time      := T#100MS;   // Sampling time dt for the controller [10 ms. .10 s]
017      SP                : LReal     := 0.0;       // Setpoint w <temperature, pressure, etc.>
018      PV                : LReal     := 0.0;       // Actual value x_t <temperature, pressure, etc.>
019      LMN_LLM           : LReal     := 0.0;       // Lower limit for the control variable y_t [0..99 %]
020      LMN_HLM           : LReal     := 100.0;     // Upper limit for control variable y_t [LMN_LLM..100 %]
021   END_VAR
022
023   VAR_OUTPUT
024      CTRL_ERR          : LReal     := 0.0;       // Actual control error e_t
025      LMN               : LReal     := 0.0;       // Control variable y_t [0..100 %]
026      ERR_CODE          : USInt     := 0;         // Error code of the A-PID controller < > 0, 0 = no error
027   END_VAR
028
029   VAR_IN_OUT
030      SELF_TUN_ON       : Bool      := FALSE;     // Activate auto-tuning for the A-PID controller
031      GAIN              : LReal     := 1.0;       // Proportional coefficient K_p [0.01..30]
032      TI                : LTime     := LT#1S;     // Reset time T_i [CYCLE. .100 m]
033      TD                : LTime     := LT#1S;     // Derivative time T_d [0..60 s]
034      TUN_ERR_TOLER     : LReal     := 0.01;      // Threshold value to stop auto-tuning [0..100]
035      TUN_COMPL_TM      : Time      := T#3S;      // Delay to stop auto-tuning [1 s..1 m]
036      LMN_MAN           : LReal     := 0.0;       // Control variable for the manual mode [0..100 %]
037   END_VAR
038
039   VAR
040      Kp                : LReal     := 1.0;       // Proportional coefficient K_p
041      Ki                : LReal     := 1.0;       // Integral action coefficient K_i
042      Kd                : LReal     := 1.0;       // Derivative action coefficient K_d
```

APPENDIX A-continued

A source code of the adaptive digital PID controller

```
043    PASS_NO         : USInt      := 0;            // Pass counter for auto-tuning [0..2]
044
045    e: STRUCT // Control errors at different times
046       t            : LReal;       // Control error e_t at time t
047       t1           : LReal;       // Control error e_{t-1} at time t-1
048       t2           : LReal;       // Control error e_{t-2} at time t-2
049       t3           : LReal;       // Control error e_{t-3} at time t-3
050       t4           : LReal;       // Control error e_{t-4} at time t-4
051       sqr          : LReal;       // Control error squared e^2_t at time t
052    END_STRUCT;
053
054    y: STRUCT // Control variables
055       out: LReal; // Internal control variable y_t [0..100 %]
056    END_STRUCT;
057
058    d: STRUCT // Calculated 1st order differentials
059       e            : LReal;       // 1st order differential de_t of the control error e_t
060       Kp           : LReal;       // Adjustment step value dK_p for the proportional coefficient K_p
061       Ki           : LReal;       // Adjustment step value dK_i for the integral action coefficient K_i
062       Kd           : LReal;       // Adjustment step value dK_d for the derivative action coefficient K_d
063       y            : LReal;       // Control variable change dy_{t+1} for the time t+1
064       y_t1         : LReal;       // Control variable change dy_t in previous cycle
065    END_STRUCT;
066
067    d2: STRUCT // Calculated 2nd order differentials
068       e:   LReal;                 // 2nd order differential d^2e_t of the control error e_t
069       y:   LReal;                 // 2nd order differential d^2y_t of the control variable y_t
070    END_STRUCT;
071
072    d3: STRUCT // Calculated 3rd order differentials
073       e: LReal;  // 3rd order differential d^3e_t of the control error e_t
074    END_STRUCT;
075
076    a: STRUCT // Adjustment speeds for parameters of the A-PID controller
077       Kp:    LReal        := 1.0;  // Adjustment speed a_p for the proportional coefficient K_p
078       Ki:    LReal        := 1.0;  // Adjustment speed a_i for the integral action coefficient K_i
079       Kd:    LReal        := 1.0;  // Adjustment speed a_d for the derivative action coefficient K_d
080    END_STRUCT;
081
082    T_TUN_MON: TON_TIME; // Timer to stop auto-tuning for the A-PID controller
083    END_VAR
084
085    VAR_TEMP
086       LT_CYCLE       : LTime;      // Sampling time dt for the A-PID controller
087       Ts             : LReal;      // Sampling time dt for the A-PID controller [sec]
088       dKp            : LReal;      // Adjustment value for the proportional coefficient K_p
089       dKi            : LReal;      // Adjustment value for the integral action coefficient K_i
090       dKd            : LReal;      // Adjustment value for the derivative action coefficient K_d
091       a_mx_Kp        : LReal;      // Upper limit of the adjustment speed a_p for parameter K_p
092       a_mx_Ki        : LReal;      // Upper limit of the adjustment speed a_i for parameter K_i
093       a_mx_Kd        : LReal;      // Upper limit of the adjustment speed a_d for parameter K_d
094       fact_1         : LReal;      // 1st factor in an equation
095       fact_2         : LReal;      // 2nd factor in an equation
096       divisor        : LReal;      // Divisor in an equation
097
098       r: STRUCT // Time parameters converted to seconds
099          TI:     LReal;      // Reset time T_i [sec]
100          TD:     LReal;      // Derivative time T_d [sec]
101       END_STRUCT;
102    END_VAR
103
104    VAR CONSTANT
105       GAIN_MN                 : LReal      := 0.01;       // Lower limit for the proportional coefficient K_p
106       GAIN_MX                 : LReal      := 30.0;       // Upper limit for the proportional coefficient K_p
107       TI_MK                   : LTime      := LT#100M;    // Upper limit for the reset time T_i
108       TD_MK                   : LTime      := LT#1M;      // Upper limit for the derivative time T_d
109       LMN_MN                  : LReal      := 0.0;        // Lower limit for the control variable y_t [%]
110       LMN_MK                  : LReal      := 100.0;      // Upper limit for the control variable y_t [%]
111       TUN_ACCURACY            : LReal      := 1.0E-07;    // Computational accuracy for auto-tuning
112       TUN_ERR_TOLER_MN        : LReal      := 0.0;        // Minimum control error e_t to stop auto-tuning
113       TUN_ERR_TOLER_MK        : LReal      := 100.0;      // Maximum control error e_t to stop auto-tuning
114       TUN_COMPL_TM_MN         : Time       := T#1S;       // Minimum delay to stop auto-tuning
115       TUN_COMPL_TM_MK         : Time       := T#1M;       // Maximum delay to stop auto-tuning
116       CF_MN                   : LReal      := 0.0001;     // Lower limit for an adjustment speed
117       CF_MK                   : LReal      := 1.0;        // Upper limit for an adjustment speed
118    END_VAR
119
120    BEGIN
```

APPENDIX A-continued

A source code of the adaptive digital PID controller

```
121     // Reset an error code of the A-PID controller
122     #ERR_CODE := 0;
123
124     IF #CYCLE < T#10MS OR #CYCLE > T#10S THEN
125         // E01 = Sampling time CYCLE is out of the range [10 ms. .10 s]
126         #ERR_CODE                   := 1;
127         #y.out                      := 0.0;
128     ELSIF #LMN_LLM > #LMN_HLM THEN
129         // E02 = Lower limit for the control variable LMN_LLM > upper limit LMN_HLM
130         #ERR_CODE                   := 2;
131         #y.out                      := 0.0;
132     ELSIF #LMN_LLM < #LMN_MN THEN
133         // E03 = Lower limit for the control variable LMN_LLM < 0 %
134         #ERR_CODE                   := 3;
135         #y.out                      := 0.0;
136     ELSIF #LMN_HLM > #LMN_MK THEN
137         // E04 = Upper limit for the control variable LMN_HLM > 100 %
138         #ERR_CODE                   := 4;
139         #y.out                      := 0.0;
140     ELSE
141         // Convert the sampling time dt to seconds
142         #Ts := DINT_TO_LREAL(TIME_TO_DINT(#CYCLE)) / 1000.0;
143
144         // Convert the sampling time dt to IEC high resolution time
145         #LT_CYCLE := TIME_TO_LTIME(#CYCLE);
146
147         // Check the permissible values of the A-PID controller parameters
148         #GAIN          := LIMIT(IN       := #GAIN,      MN := #GAIN_MN,       MX := #GAIN_MK);
149         #TI            := LIMIT(IN       := #TI,        MN := #LT_CYCLE,      MX := #TI_MK);
150         #TD            := LIMIT(IN       := #TD,        MN := LT#0NS,         MX := #TD_ME);
151         #TUN_ERR_TOLER                   := LIMIT(IN := #TUN_ERR_TOLER,       MN := #TUN_ERR_TOLER_MN,
152                                                                                MX := #TUN_ERR_TOLER_MX);
153         #TUN_COMPL_TM                    := LIMIT(IN := #TUN_COMPL_TM,        MN := #TUN_COMPL_TM_MN,
154                                                                                MX := #TUN_COMPL_TM_MX);
155         #LMN_MAN                         := LIMIT(IN := #LMN_MAN,             MN := #LMN_MN, MX := #LMN_MX) ;
156
157         // Save the previous control errors
158         #e.t4 := #e.t3;
159         #e.t3 := #e.t2;
160         #e.t2 := #e.t1;
161         #e.t1 := #e.t;
162
163         // Calculate a control error e_t according to the specified control direction
164         IF #INV_CONTROL THEN
165             #e.t := #PV - #SP;
166         ELSE
167             #e.t := #SP - #PV;
168         END_IF;
169
170         // Output an actual control error e_t
171         IF #INV_CONTROL THEN
172             #CTRL_ERR := -#e.t;
173         ELSE
174             #CTRL_ERR := #e.t;
175         END_IF;
176
177         // Activate the A-PID controller in automatic mode
178         IF #AUTO_ON AND NOT #MAN_ON THEN
179             // Stop condition for auto-tuning of the A-PID controller
180             #T_TUN_MON(IN:= #SELF_TUN_ON AND ABS(#e.t) <= #TUN_ERR_TOLER, PT: =
                #TUN_COMPL_TM);
181             IF #T_TUN_MON.Q THEN
182                 #SELF_TUN_ON            := FALSE;
183                 #PASS_NO                := 0;
184             END_IF;
185
186             // Convert a reset time T_i to seconds
187             #r.TI := LINT_TO_LREAL(LTIME_TO_LINT(#TI)) / 1.0E+9;
188
189             // Calculate an integral action coefficient K_i
190             #Ki := #GAIN / #r.TI;
191
192             // Convert a derivative time T_d to seconds
193             #r.TD := LINT_TO_LREAL(LTIME_TO_LINT(#TD)) / 1.0E+9;
194
195             // Calculate a derivative action coefficient K_d
196             #Kd := #GAIN * #r.TD;
197
```

APPENDIX A-continued

A source code of the adaptive digital PID controller

```
198        // Save a proportional coefficient Kp
199        #Kp := #GAIN;
200
201        (****************************************************************
202         *         AUTO-TUNING OF THE A-PID CONTROLLER PARAMETERS       *
203         ****************************************************************)
204        IF #SELF_TUN_ON AND ABS (#e.t4) > 0.0 AND ABS (#d.y_t1) > 0.0 THEN
205           // Calculate a 2nd order differential d²yt for the control variable yt
206           #d2.y := #d.y - #d.y_t1;
207
208           // Calculate a 1st order differential det for a control error et
209           #d.e := #e.t - #e.t1;
210
211           // Calculate a 2nd order differential d²et for a control error et
212           #d2.e := #e.t - 2.0 * #e.t1 + #e.t2;
213
214           // Calculate a 3rd order differential d²et for a control error et
215           #d3.e := #e.t - 3.0 * #e.t1 + 3.0 * #e.t2 - #e.t3;
216
217           // Calculate upper limits for the adjustment speeds of controller parameters
218           #e.sgr              := #e.t * #e.t;
219           #a_mx_Kp            := LIMIT(IN := #e.sgr * #e.sgr / 2.71828,         MN := #CF_MN, MX := #CF_ME);
220           #a_mx_Ki            := LIMIT(IN := 4.0 * ABS(#e.sgr * #e.t) / 2.71828,
221                                                                                 MN := #CF_MN, MX := #CF_ME);
222           #a_mx_Kd            := LIMIT(IN := ABS(#e.t * #e.sgr * #e.sgr) / 13.5914,
223                                                                                 MN := #CF_MN, MX := #CF_ME);
224           (****************************************************************
225            *              AUTO-TUNING OF THE PROPORTIONAL PART             *
226            ****************************************************************)
227           // Perform auto-tuning for the proportional coefficient Kp
228           IF #PASS_NO = 0 THEN
229              // Calculate an adjustment step value dKp for the proportional coefficient Kp
230              IF ABS(#d.e) > #TUN_ACCURACY THEN
231                 #fact_1          := #d2.y - #Ki * #d.e * #Ts - #Kd * #d3.e / #Ts;
232                 #fact_2          := #d.y - #Ki * #e.t * #Ts - #Kd * #d2.e / #Ts;
233                 #d.Kp            := (#fact_1 * #d.e - #fact_2 * #d2.e) / (#d.e * #d.e);
234              ELSE
235                 #d.Kp := 0.0;
236              END_IF;
237
238              // Calculate an adjustment speed ap for the proportional coefficient Kp
239              #divisor := #d.Kp * #d.e;
240              IF ABS(#divisor) > #TUN_ACCURACY THEN
241                 #a.Kp := (#Kp * #d.e + #Kd * #d2.e / #Ts - #d.y) * #Ts / #divisor;
242                 #a.Kp := LIMIT(IN := #a.Kp, MN := #CF_MN, MX := #a_mx_Kp);
243              ELSE
244                 #a.Kp := #CF_MN;
245              END_IF;
246
247              // Adjust the proportional coefficient Kp
248              #dKp             := LIMIT(IN := #a.Kp * #d.Kp,       MN := -0.5,        MX := 0.5);
249              #GAIN            := LIMIT(IN := #GAIN - #dKp ,       MN := #GAIN_MN,    MX := #GAIN_MX);
250              #Kp              := #GAIN;
251           END_IF;
252
253           (****************************************************************
254            *                AUTO-TUNING OF THE INTEGRAL PART               *
255            ****************************************************************)
256           // Perform auto-tuning for the integral action coefficient Ki
257           IF #PASS_NO = 1 THEN
258              // Calculate an adjustment step value dKi for integral action coefficient Ki
259              IF ABS(#e.t) > #TUN_ACCURACY THEN
260                 #fact_1          := #d2.y - #Kp * #d2.e - #Kd * #d3.e / #Ts;
261                 #fact_2          := #d.y - #Kp * #d.e - #Kd * #d2.e / #Ts;
262                 #d.Ki            := (#fact_1 * #e.t - #fact_2 * #d.e) / (#e.t * #e.t * #Ts);
263              ELSE
264                 #d.Ki            := 0.0;
265              END_IF;
266
267              // Calculate an adjustment speed ai for the integral action coefficient Ki
268              #divisor := #d.Ki * #e.t;
269              IF ABS(#divisor) > #TUN_ACCURACY THEN
270                 #a.Ki := (#d.y - #Ki * #e.t * #Ts - #Kd * #d2.e / #Ts) * #Ts / #divisor;
271                 #a.Ki := LIMIT(IN := #a.Ki, MN := #CF_MN, MX := #a_mx_Ki);
272              ELSE
273                 #a.Ki := #CF_MN;
274              END_IF;
275
```

APPENDIX A-continued

A source code of the adaptive digital PID controller

```
276            // Adjust the integral action coefficient Ki
277            #dKi              := LIMIT(IN       := #a.Ki * #d.Ki, MN := -0.5, MX := 0.5);
278            #Ki               := LIMIT(IN       := #Ki + #dKi,
279               MN                               := #GAIN * 1.0E+9 / LINT_TO_LREAL(LTIME_TO_LINT(#TI_MX)),
280               MX                               := #GAIN / #Ts);
281
282            // Convert Ki to a reset time Ti [sec]
283            #r.TI := #GAIN / #Ki;
284
285            // Convert a reset time Ti [sec] to IEC high resolution time
286            #TI := LINT_TO_LTIME(LREAL_TO_LINT(#r.TI * 1.0E+9));
287         END_IF;
288
289         (************************************************************
290          *               AUTO-TUNING OF THE DERIVATIVE PART         *
291          ************************************************************)
292         // Perform auto-tuning for the derivative action coefficient Kd
293         IF #PASS_NO = 2 THEN
294            // Calculate an adjustment step value dKd for the derivative action coeff. Kd
295            IF ABS(#d2.e) > #TUN_ACCURACY THEN
296               #fact_1 := #d2.y - #Kp * #d2.e - #Ki * #d.e * #Ts;
297               #fact_2 := #d.y - #Kp * #d.e - #Ki * #e.t * #Ts;
298               #d.Kd := (#fact_1 * #d2.e - #fact_2 * #d3.e) * #Ts / (#d2.e * #d2.e);
299            ELSE
300               #d.Kd := 0.0;
301            END_IF;
302
303            // Calculate an adjustment speed ad for the derivative action coefficient Kd
304            #divisor := #d.Kd * #d2.e;
305            IF ABS(#divisor) >#TUN_ACCURACY THEN
306               #a.Kd := (#Kp * #d.e + #Kd * #d2.e / #Ts - #d.y) * #Ts * #Ts / #divisor;
307               #a.Kd := LIMIT(IN := #a.Kd, MN := #CF_MN, MX := #a_mx_Kd);
308            ELSE
309               #a.Kd := #CF_MN;
310            END_IF;
311
312            // Adjust the derivative action coefficient Kd
313            #dKd              := LIMIT(IN       := #a.Kd * #d.Kd,        MN := -0.5,    MX := 0.5);
314            #Kd               := LIMIT(IN       := #Kd - #dKd,           MN := 0.0,
315               MX                               := #GAIN * LINT_TO_LREAL(LTIME_TO_LINT(#TD_MX))/ 1.0E+9);
316
317            // Convert Kd to a derivative time Td [sec]
318            #r.TD := #Kd / #GAIN;
319
320            // Convert a derivative time Td [sec] to IEC high resolution time
321            #TD := LINT_TO_LTIME(LREAL_TO_LINT(#r.TD * 1.0E+9));
322         END_IF;
323
324         // Increase a pass counter by one for auto-tuning
325         #PASS_NO := #PASS_NO + 1;
326
327         // Reset a pass counter if it is greater than 2
328         IF #PASS_NO > 2 THEN
329            #PASS_NO := 0;
330         END_IF;
331      ELSE
332         #PASS_NO := 0;
333      END_IF;
334
335      (****************************************************
336       *                  DRIVE CONTROL                   *
337       ****************************************************)
338      // Save a control variable change dyt
339      #d.y_t1 := #d.y;
340
341      // Calculate a control variable change dyt+i for the time t+1
342      #d.y := (#Kp + #Ki * #Ts + #Kd / #Ts) * #e.t - (#Kp + 2.0 * #Kd / #Ts) * #e.t1 +
343         #Kd / #Ts * #e.t2;
344
345      // Modify the control variable yt at time t
346      #y.out := LIMIT(IN := #y.out + #d.y, MN := #LMN_LLM, MX := #LMN_HLM);
347   ELSE
348      IF #MAN_ON THEN
349         // Use the control variable for manual mode
350         #y.out := LIMIT(IN := #LMN_MAN, MN := #LMN_MN, MX := #LMN_MX);
351      ELSE
352         // Reset a control variable yt at standstill
353         #y.out := #LMN_MN;
```

APPENDIX A-continued

A source code of the adaptive digital PID controller

```
354            END_IF;
355         // Reset the internal controller variables
356            #d.y            := #d.y_t1       := 0.0;
357            #e.t            := #e.t1         := #e.t2 := #e.t3 := 0.0;
358            #PASS_NO        := 0;
359         END_IF;
360      END_IF;
361
362      // Move the actual control variable y_t to the control variable for manual mode
363      #LMN_MAN := #y.out;
364
365      // Output a control variable y_t
366      #LMN := #y.out;
367
368   END_FUNCTION_BLOCK
```

The invention claimed is:

1. An adaptive tuning method for parameters of a digital PID controller, which is characterized by a cyclic sequence of operations to adjust in equal time intervals only one PID parameter $K_p$, $K_i$, or $K_d$ at any time point t in a closed control loop by analog feedback of the actual value $x_t$ by means of a pass counter and three additional indices k for $K_p$, m for $K_i$, and n for $K_d$ used as iteration steps, and:

1) A tuning equation to calculate an adjustment step value $dK_{p\ k}$ for a proportional coefficient $K_p$ in iteration step k at time t:

$$dK_{p_k} = \frac{\left(d^2 y_t - K_{i_{m-1}} \cdot de_t \cdot dt - K_{d_{n-1}} \cdot \frac{d^3 e_t}{dt}\right) \cdot de_t}{(de_t)_2} - \frac{\left(dy_t - K_{i_{m-1}} \cdot e_t \cdot dt - K_{d_{n-1}} \cdot \frac{d^2 e_t}{dt}\right) \cdot d^2 e_t}{(de_t)_2},$$

where:
- dt is the sampling time of a digital PID controller;
- $dy_t$ is a control variable change at time t, which is determined as $dy_t = y_t - y_{t-1}$, $\forall t \geq 1$ on the condition that $dy_0 = y_0$;
- $d^2 y_t$ is the $2^{nd}$ order differential of the control variable $y_t$ at time t, which is calculated as $d^2 y_t = dy_t - d_{y-1}$, $\forall t \geq 1$ on the condition that $d^2 y_0 = dy_0$;
- $e_t$ is the control error between the setpoint w and the actual value $x_t$ at time t, which is calculated as $e_t = w - x_t$, $\forall t \geq 0$;
- $de_t$ is a $1^{st}$ order differential of the control error $e_t$ at time t, which is calculated as $de_t = e_t - e_{t-1}$, $\forall t \geq 1$ on the condition that $de_0 = e_0$;
- $d^2 e_t$ is a $2^{nd}$ order differential of the control error $e_t$ at time t, which is calculated as $d^2 e_t = e_t - 2 \cdot e_{t-1} + e_{t-2}$, $\forall t \geq 2$ on the condition that $d^2 e_0 = e_0$ and $d^2 e_1 = e_1 - 2 \cdot e_0$;
- $d^3 e_t$ is a $3^{rd}$ order differential of the control error $e_t$ at time t, which is calculated as $d^3 e_t = e_t - 3 \cdot e_{t-1} \cdot e_{t-2} - e_{t-3}$; $\forall t \geq 3$ on the condition that $d^3 e_0 = e_0$, $d^3 e_1 = e_1 - 3 \cdot e_0$, and $d^3 e_2 = e_2 - 3 \cdot e_1 + 3 \cdot e_0$;
- $K_{i\ m-1}$ is the actual integral action coefficient $K_i$ at time t, which was modified in iteration step m−1; $\forall m > 1$ on the condition that $K_{i\ 0}$ was assigned a certain initial value for $K_i$;
- $K_{d\ n-1}$ is the actual derivative action coefficient $K_d$ at time t, which was modified in iteration step n−1, $\forall n > 1$ on the condition that $K_{d\ 0}$ was assigned a certain initial value for $K_d$, 2) a tuning equation to calculate the adjustment speed $\alpha_{p\ k}$ for the proportional coefficient $K_p$ in iteration step k at time t:

$$\alpha_{p_k} = \frac{K_{p_{k-1}} \cdot de_t + K_{d_{n-1}} \cdot \frac{d^2 e_t}{dt} - dy_t}{dK_{p_k} \cdot de_t} \cdot dt,$$

$$\alpha_{p_k} \in \left[0.001, \frac{e_t^4}{2.71828} \in [0.0001, 1]\right],$$

where:
- $K_{p\ k-1}$ is the actual proportional coefficient $K_p$ at time t, which was modified in iteration step k−1; $\forall k > 1$ on the condition that $K_{p\ 0}$ was assigned a certain initial value for $K_p$, 3) a tuning equation of the proportional coefficient $K_p$ in a negative direction for iteration step k:

4) a tuning equation to calculate the adjustment step value $dK_{i\ m}$ for an integral action coefficient $K_i$ in iteration step m at time t:

$$dK_{i_m} = \frac{\left(d^2 y_t - K_{p_k} \cdot d^2 e_t - K_{d_{n-1}} \cdot \frac{d^3 e_t}{dt}\right) \cdot e_t}{e_t^2 \cdot dt} - \frac{\left(dy_t - K_{p_k} \cdot de_t - K_{d_{n-1}} \cdot \frac{d^2 e_t}{dt}\right) \cdot de_t}{e_t^2 \cdot dt},$$

5) a tuning equation to calculate the adjustment speed $\alpha_{i\ m}$ for the integral action coefficient $K_i$ in iteration step m at time t:

$$\alpha_{i_m} = \frac{dy_t - K_{i_{m-1}} \cdot e_t \cdot dt - K_{d_{n-1}} \cdot \frac{d^2 e_t}{dt}}{dK_{i_m} \cdot e_t} \cdot dt,$$

$$\alpha_{i_m} \in \left[0.001, \frac{4 \cdot |e_t^3|}{2.71828} \in [0.0001, 1]\right]$$

6) a tuning equation of the integral action coefficient $K_i$ in a positive direction for iteration step m:

7) a tuning equation to calculate the adjustment step value $dK_{d\ n}$ for a derivative action coefficient $K_d$ in iteration step n at time t:

$$dK_{d_n} = \left( \frac{(d^2y_t - K_{p_k} \cdot d^2e_t - K_{i_m} \cdot de_t \cdot dt) \cdot d^2e_t}{(d^2e_t)_2} - \frac{(dy_t - K_{p_k} \cdot de_t - K_{i_m} \cdot e_t \cdot dt) \cdot d^3e_t}{(d^2e_t)_2} \right) \cdot dt,$$

8) a tuning equation to calculate the adjustment speed $\alpha_{d\ n}$ for the derivative action coefficient $K_d$ in iteration step n at time t:

$$\alpha_{d_n} = \frac{K_{p_k} \cdot de_t + K_{d_{n-1}} \cdot \frac{d^2e_t}{dt} - dy_t}{dK_{d_n} \cdot d^2e_t} \cdot dt^2,$$

$$\alpha_{d_n} \in \left[ 0.001, \frac{|e_t^5|}{13.5914} \in [0.0001, 1] \right]$$

9) a tuning equation of the derivative action coefficient $K_d$ in a negative direction for iteration step n:

$$K_{d_n} = K_{d_{n-1}} - \alpha_{d_n} \cdot dK_{d_n},$$

$$\alpha_{d_n} \cdot dK_{d_n} \in [-0.5, +0.5]$$

and using the above tuning equations derived by reverse engineering of the digital PID controller to automatically adjust the PID controller parameters; and control a controlled system based on the adjusted parameters of the PID controller.

2. The adaptive tuning method for parameters of a digital PID controller of claim 1, wherein the adaptive tuning of the PID controller parameters $K_p$, $K_i$, and $K_d$ is performed cyclically in equal time intervals and comprises a sequence of steps, the steps being:

S01: start
S02: reset a time index t to 0 and set a time counter to 0 seconds
S03: reset an iteration step k for $K_p$ to 0
S04: reset an iteration step m for $K_i$ to 0
S05: reset an iteration step n for $K_d$ to 0
S06: set the proportional coefficient $K_p$ to an initial value when k=0
S07: set the integral action coefficient $K_i$ to an initial value when m=0
S08: set the derivative action coefficient $K_d$ to an initial value when n=0
S09: increase the iteration step k for $K_p$ by 1
S10: increase the iteration step m for $K_i$ by 1
S11: increase the iteration step n for $K_d$ by 1
S12: reset a pass counter to 0
S13: set a control variable $y_t$ to 0 at time t
S14: set a control variable change $dy_t$ to 0 at time t
S15: set a control variable change $d_{y+1}$ to 0 for time t+1
S16: increase a time index t by 1 and a time counter by the sampling time dt
S17: calculate an actual control error $e_t$ between the setpoint w and the actual value $x_t$ at time t as $e_t = w - x_t$
S18: if the time index t>3, go to step S19, otherwise go back to step S13
S19: if an absolute value of the actual control error $e_t$ falls below a specified threshold, go to step S41, otherwise go to step S20
S20: evaluate a pass counter between 0 and 2: if its value is 0, go to step S21; if its value is 1, go to step S25; or if its value is 2, go to step S29
S21: calculate an adjustment step value $dK_{p\ k}$ for the proportional coefficient $K_p$ in iteration step k at time t:

$$dK_{p_K} = \frac{\left( d^2y_t - K_{i_{m-1}} \cdot de_t \cdot dt - K_{d_{n-1}} \cdot \frac{d^3e_t}{dt} \right) \cdot de_t}{(de_t)^2} - \frac{\left( dy_t - K_{i_{m-1}} \cdot e_t \cdot dt - K_{d_{n-1}} \cdot \frac{d^2e_t}{dt} \right) \cdot d^2e_t}{(de_t)^2},$$

where:
$d^2y_t$ is the $2^{nd}$ order differential of the control variable $y_t$ at time t, which is calculated as $d^2y_t = dy_t - d_{y-1}$;

$de_t$ is a $1^{st}$ order differential of the control error $e_t$ at time t, which is calculated as $de_t = e_t - e_{t-1}$;

$d^2e_t$ is a $2^{nd}$ order differential of the control error $e_t$ at time t, which is calculated as $d^2e_t = e_t - 2 \cdot e_{t-1} + e_{t-2}$;

$d^3e_t$ is a $3^{rd}$ order differential of the control error $e_t$ at time t, which is calculated as $d^3e_t = e_t - 3 \cdot e_{t-1} \cdot e_{t-2} - e_{t-3}$;

$K_{i\ m-1}$ is the actual integral action coefficient $K_i$ at time t, which was modified in iteration step m−1;

$K_{d\ n-1}$ is the actual derivative action coefficient $K_d$ at time t, which was modified in iteration step n−1

S22: calculate an adjustment speed $\alpha_{p\ k}$ for the proportional coefficient $K_p$ in iteration step k at time t:

$$\alpha_{p_K} = \frac{K_{p_{k-1}} \cdot de_t + K_{d_{n-1}} \cdot \frac{d^2e_t}{dt} - dy_t}{aK_{p_k} ae_t} \cdot dt,$$

$$\alpha_{p_K} \in \left[ 0.0001, \frac{e_t^4}{2.71828} \in [0.0001, 1] \right],$$

where:
$K_{p\ k-1}$ is the actual proportional coefficient $K_p$ at time t, which was modified in iteration step k−1

S23: adjust the proportional coefficient $K_p$ in iteration step k:

S24: go to step S32

S25: calculate an adjustment step value $dK_{i\ m}$ for the integral action coefficient $K_i$ in iteration step m at time t:

$$dK_{i_m} = \frac{\left( d^2y_t - K_{p_k} \cdot d^2e_t - K_{d_{n-1}} \cdot \frac{d^3e_t}{dt} \right) \cdot e_t}{e_t \cdot ar \wedge} - \frac{\left( dy_t - K_{p_k} \cdot de_t - K_{d_{n-1}} \cdot \frac{d^2e_t}{dt} \right) \cdot de_t}{e_t^2 \cdot dt}$$

S26: Calculate an adjustment speed $\alpha_{i\,m}$ for the integral action coefficient $K_i$ in iteration step m at time t:

$$\alpha_{i_m} = \frac{dy_t - K_{i_{m-1}} \cdot e_t \cdot dt - K_{d_{n-1}} \cdot \frac{d^2 e_t}{dt}}{a K_{i_m} e_t} \cdot dt,$$

$$\alpha_{i_m} \in \left[0.0001, \frac{4 \cdot |e_t^3|}{2.71828} \in [0.0001, 1]\right]$$

S27: adjust the integral action coefficient $K_i$ in iteration step m:

S28: go to step S32

S29: calculate an adjustment step value $dK_{d\,n}$ for the derivative action coefficient $K_d$ in iteration step n at time t:

$$dK_{d_n} = \frac{(d^2 y_t - K_{p_k} \cdot d^2 e_t - K_{i_m} \cdot de_t \cdot dt) \cdot d^2 e_t}{(d^2 e_t)^2} -$$

$$- \frac{(dy_t - K_{p_k} \cdot de_t - K_{i_m} \cdot e_t \cdot dt) \cdot d^3 e_t}{(d^2 e_t)^2} \cdot dt$$

S30: calculate the adjustment speed $\alpha_{d\,n}$ for the derivative action coefficient $K_d$ in iteration step n at time t:

$$\alpha_{d_n} = \frac{K_{p_k} \cdot de_t + K_{d_{n-1}} \cdot \frac{d^2 e_t}{dt} - dy_t}{dK_{d_n} \cdot d^2 e_t} \cdot dt^2,$$

$$\alpha_{d_n} \in \left[0.0001, \frac{|e_t^5|}{13.5914} \in [0.0001, 1]\right]$$

S31: adjust the derivative action coefficient $K_d$ in iteration step n:

S32: increase the pass counter by 1

S33: if the pass counter<3, go to step S38, otherwise go to step S34

S34: increase the iteration step k for $K_p$ by 1

S35: increase the iteration step m for $K_i$ by 1

S36: increase the iteration step n for $K_d$ by 1

S37: reset the pass counter to 0

S38: calculate a control variable change $dy_{t+1}$ for time t+1 according to the PID velocity algorithm using the actual values of the PID controller parameters $K_p$, $K_i$, and $K_d$ at time t:

$$dy_{t+1} = \left(K_p + K_i \cdot dt + \frac{K_d}{dt}\right) \cdot e_t - \left(K_p + 2 \cdot \frac{K_d}{dt}\right) \cdot e_{t-1} + \frac{K_d}{dt} \cdot e_{t-2}$$

S39: modify the control variable $y_t$ at time t:

S40: go back to step S16

S41: end.

\* \* \* \* \*